Figure 1:
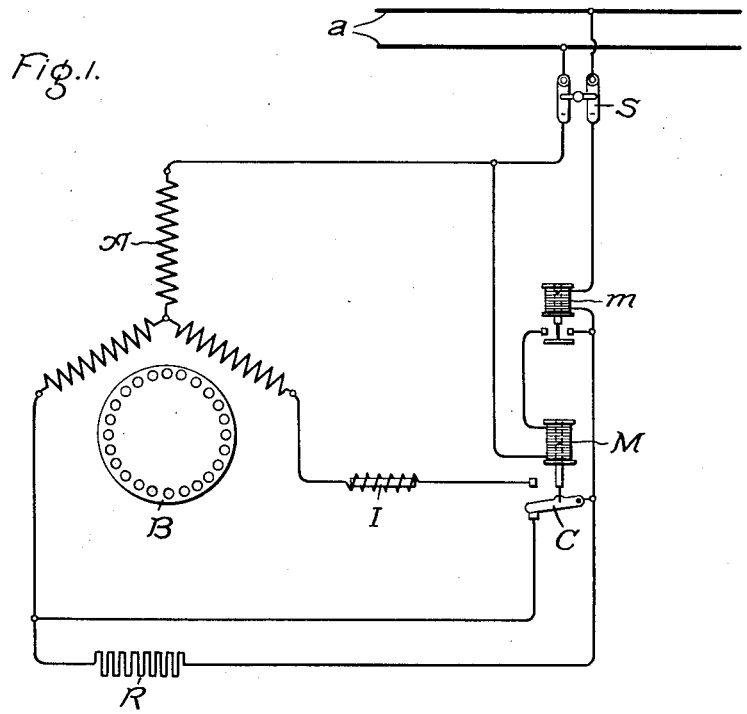

No. 887,612. PATENTED MAY 12, 1908.
A. R. EVEREST.
CONTROLLING MEANS FOR ALTERNATING CURRENT MOTORS.
APPLICATION FILED JUNE 22, 1905.

Witnesses:
Marcus L. Byng.
Allen A. Ford

Inventor:
Augustine R. Everest,
by Albert G. Davis
Att'y.

UNITED STATES PATENT OFFICE.

AUGUSTINE R. EVEREST, OF LYNN, MASSACHUSETTS, ASSIGNOR TO GENERAL ELECTRIC COMPANY, A CORPORATION OF NEW YORK.

CONTROLLING MEANS FOR ALTERNATING-CURRENT MOTORS.

No. 887,612.      Specification of Letters Patent.      Patented May 12, 1908.

Application filed June 22, 1905. Serial No. 266,432.

*To all whom it may concern:*

Be it known that I, AUGUSTINE R. EVEREST, a subject of the King of Great Britain, residing at Lynn, county of Essex, State of Massachusetts, have invented certain new and useful Improvements in Controlling Means for Alternating-Current Motors, of which the following is a specification.

My invention relates to the control of alternating-current motors and particularly of single-phase motors of the induction type. As is well known, such motors will not start from rest unless special starting means are employed, such as auxiliary starting windings or phase-splitting devices, or both. It is generally desirable when such starting devices are employed that they should be cut out of circuit when the motor is up to speed, since they are generally designed for operation for only a short time and would become overheated if left in the circuit of the motor. Furthermore, the running efficiency of the motor would be impaired. If, however, the starting devices are cut out of circuit and the motor should then be brought to rest from some cause, such as the failure of current, and current should again be supplied to the motor, the motor would not start, but would draw a large current from the line, which would overheat and eventually damage the motor.

The object of my invention is to provide automatic means for cutting in the starting devices whenever the motor is connected to a suitable source of current and for automatically cutting out said devices after the motor is started. To secure these results I take advantage of the abnormal flow of current at starting and place a magnet in series with the motor; and arrange a switch, controlled by the magnet, which normally cuts the starting devices out of circuit, but which, when current of a predetermined amount flows through the magnet, is moved so as to cut the starting devices into circuit.

My invention consequently consists in the combination with a single-phase motor having different connections for starting and running, of a switch arranged normally to establish running connections, a magnet winding in series with the motor, and means controlled by the magnet winding for moving the switch to establish starting connections. By this means the starting devices are always out of circuit when the motor is operating under normal conditions, but whenever the motor stops and later a current is again supplied to it, the abnormal current energizes the magnet winding to move the switch so as to cut the starting devices into circuit, and these devices are maintained in circuit until the current again falls to its normal amount as the motor speeds up.

Figure 2:
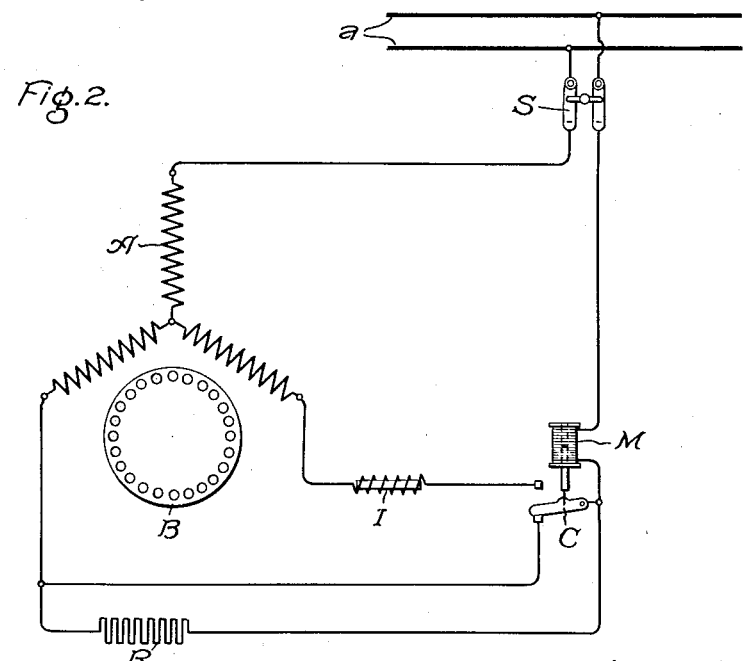

My invention further comprises certain arrangements and circuit connections which will be best understood by reference to the accompanying drawings, in which Figure 1 shows diagrammatically a motor provided with automatic controlling means in accordance with my invention; and Fig. 2 shows a modification of the same.

In Fig. 1 A represents the primary winding of the motor, which is shown as a three-phase Y-connected winding, B represents the rotor winding which may be of the well-known squirrel-cage type. *a* represents a suitable source of current to which the primary winding of the motor may be connected through the switch S.

*m* represents a magnet winding in series with the motor. The armature of this magnet winding controls the circuit of a second magnet winding M, which operates a switch member C.

I and R represent an inductance and resistance respectively, which serve for starting the motor in the manner well understood in the art.

Switch member C is normally in the position shown, in which position two of the motor terminals are connected directly to the source of current *a* through the switch S, and the inductance I and resistance R are cut out of circuit; the former being open-circuited and the latter short-circuited. The relay magnet *m* is in series with the motor. Now, if the motor should stop, as, for instance, by the failure of current, and then current should again be supplied to the motor, an abnormal flow of current would ensue, which would energize the relay *m* and cause it to close the circuit of the magnet M which in turn would pull up its armature, moving the switch member C to its other position. In this other position all three terminals of the motor are connected to the source of current, with the inductance I in series with one terminal and the resistance R in series with another: that is, the motor is then properly connected for starting with the phase-splitting devices in circuit. The motor consequently starts up in the usual manner, and as the speed rises the motor current decreases, due to the rise of counter-electromotive force, until the current through the motor falls to such a value that the relay magnet m releases its armature, thereby breaking the circuit of magnet M, which in turn allows switch C to fall to the position shown in the drawing when the motor is again connected for running. The entire control is thus automatic, and all that is required at any time of the operator is to close the switch S when the motor is first to be started.

My invention is not limited to the specific motor connections or starting devices shown. For instance, the motor winding may be arranged otherwise than in three-phase star, and since the only requisite for the starting devices is that they shall be of different impedance factors, a condenser may be substituted for either the resistance or inductance. Furthermore, the relay magnet may be omitted and the switch-actuating magnet connected directly in the motor circuit as shown in Fig. 2. The purpose of the relay is to give a more sensitive and positive action. Also since the relay may be made much smaller than the switch operating magnet the impedance in the motor circuit is less, and less power is wasted in the magnet winding than would be the case if the relay were omitted. Accordingly, I do not desire to limit myself to the particular construction and arrangement of parts here shown but aim in the appended claims to cover all modifications which are within the scope of my invention.

What I claim as new and desire to secure by Letters Patent of the United States, is,—

1. In combination with an alternating-current motor adapted to be operated from a single-phase source of supply having different connections for starting and for running, a normally open switch included in the starting connections, a magnet winding in series with said motor, and means controlled by said magnet winding for closing said switch to establish starting connections.

2. In combination with an alternating-current motor, starting devices therefor, a switch arranged normally to cut said devices out of circuit, a magnet winding in series with said motor, and means controlled by said magnet winding for moving said switch to cut in said starting devices when the current in said winding exceeds a predetermined amount.

3. In combination with a motor adapted to be operated from a single-phase source of supply, phase-modifying means for producing a current of displaced phase in a portion of the windings of said motor, a switch arranged normally to cut said phase-modifying means out of circuit, and a magnet winding in the motor-circuit for moving said switch to cut in said phase-modifying means when the current in said motor-circuit exceeds a predetermined amount.

4. In combination with an induction motor having a three-phase primary winding, a connection from one terminal of said winding to a source of single-phase current, two devices of different impedance factors connected in series with the other two terminals of said winding, a switch normally connecting a point between one of the latter terminals and one of said devices to the source and arranged when moved to break said connection and to connect the outer terminals of both of said devices to the source, a magnet winding in series with said motor, and means controlled by said magnet winding for moving said switch.

5. In combination with an alternating-current motor having different connections for starting and running, a switch arranged normally to establish running connections, a relay magnet winding in series with said motor, a second magnet winding controlled by said relay, and means operated by said second magnet winding for moving said switch to establish starting connections.

6. In combination with an alternating-current motor, starting devices therefor, a switch arranged normally to cut said devices out of circuit, a relay magnet winding in series with said motor, a second magnet winding controlled by said relay, and means operated by said second magnet winding for moving said switch to cut in said starting devices.

7. In combination with a motor adapted to be operated from a single-phase source of supply, a main supply-circuit for the motor, a starting-circuit, a normally-open switch included in the starting-circuit, and a magnet winding in the main supply-circuit for moving said switch to close the starting-circuit.

8. In combination with a motor adapted to be operated from a single-phase source of supply, a main supply-circuit for the motor, a starting-circuit, a normally-open switch included in said starting-circuit, an electromagnet connected in the main supply-circuit, and operative connections between said magnet and said switch whereby the switch is closed when the current in said magnet exceeds a predetermined amount.

In witness whereof, I have hereunto set my hand this 20th day of June, 1905.

AUGUSTINE R. EVEREST.

Witnesses:
JOHN A. MCMANUS, Jr.,
HENRY O. WESTENDARP.